Patented Mar. 5, 1946

2,396,009

UNITED STATES PATENT OFFICE 2,396,009

SILVER SOLDER

Franz R. Hensel, Indianapolis, Ind., assignor to P. R. Mallory & Co., Inc., Indianapolis, Ind., a corporation of Delaware No Drawing. Application August 20, 1942,
Serial No. 455,505

2 Claims. (Cl. 75—173)

This invention relates to silver solders.

An object of the invention is to improve silver solders and to produce a silver solder having a low melting point.

Other objects of the invention will be apparent from the description and claims.

The present invention contemplates a silver solder having a melting point lower than that ordinarily obtained with silver solders of the prior art, and preferably having a melting point around 1000° F. Such a solder is particularly useful for the brazing of heat treated steels where the temperature must be kept low in order to avoid adverse effects upon the desirable properties of the steel.

The silver solder of the present invention contains silver, antimony and copper. The ingredients may preferably be present in the following proportions:

| | Per cent |
|---|---|
| Silver | 25 to 60 |
| Antimony | 20 to 50 |
| Copper | 10 to 35 |

A suitable solder may contain:

| | Per cent |
|---|---|
| Copper | 40 |
| Antimony | 36 |
| Copper | 24 |

While specific embodiments of the invention have been described, it is intended to cover the invention broadly within the spirit and scope of the appended claims.

What is claimed is:

1. A silver solder composed of 25 to 60% silver, 10 to 35% copper and 20 to 50% antimony.

2. A silver solder composed of about 40% silver, about 24% copper and about 36% antimony.

FRANZ R. HENSEL.

Certificate of Correction

Patent No. 2,396,009. March 5, 1946.

FRANZ R. HENSEL

It is hereby certified that error appears in the printed specification of the above numbered patent requiring correction as follows: Second column, line 7, in the table, for "Copper" read *Silver*; and that the said Letters Patent should be read with this correction therein that the same may conform to the record of the case in the Patent Office.

Signed and sealed this 30th day of April, A. D. 1946.

[SEAL]

LESLIE FRAZER,
*First Assistant Commissioner of Patents.*